United States Patent
Asaura et al.

(10) Patent No.: US 10,233,805 B2
(45) Date of Patent: Mar. 19, 2019

(54) EXHAUST GAS CONTROL SYSTEM

(71) Applicant: TOYOTA JIDOSHA KABUSHIKI KAISHA, Toyota-shi, Aichi-ken (JP)

(72) Inventors: Shinya Asaura, Numazu (JP); Masaaki Sato, Susono (JP); Ryohei Ono, Susono (JP); Yuji Miyoshi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 73 days.

(21) Appl. No.: 15/634,156

(22) Filed: Jun. 27, 2017

(65) Prior Publication Data
US 2018/0003095 A1 Jan. 4, 2018

(30) Foreign Application Priority Data
Jun. 30, 2016 (JP) ................. 2016-129884

(51) Int. Cl.
| F01N 3/00 | (2006.01) |
| F01N 3/04 | (2006.01) |
| F01N 3/025 | (2006.01) |
| F01N 3/20 | (2006.01) |
| F01P 3/20 | (2006.01) |

(52) U.S. Cl.
CPC .......... F01N 3/043 (2013.01); F01N 3/0253 (2013.01); F01N 3/2033 (2013.01); F01N 3/2066 (2013.01); F01P 3/20 (2013.01); F01N 2610/02 (2013.01); F01N 2610/1453 (2013.01); F01P 2060/12 (2013.01)

(58) Field of Classification Search
USPC ......... 60/274, 286, 295, 297, 298, 301, 303, 60/320, 324
See application file for complete search history.

(56) References Cited

U.S. PATENT DOCUMENTS

| 6,513,323 B1* | 2/2003 | Weigl ................ B01D 53/9431 60/286 |
| 8,875,502 B2* | 11/2014 | Fuchs .................. F01N 3/2066 60/274 |
| 2009/0293460 A1* | 12/2009 | Hirata ..................... F01N 3/208 60/286 |
| 2013/0283769 A1* | 10/2013 | Watanabe ............... F01N 3/208 60/274 |

(Continued)

FOREIGN PATENT DOCUMENTS

JP 2012-97729 5/2012

OTHER PUBLICATIONS

S. Asaura et al., "Exhaust Gas Control System for Internal Combustion Engine," U.S. Appl. No. 15/634,073, filed Jun. 27, 2017.

Primary Examiner — Binh Q Tran
(74) Attorney, Agent, or Firm — Finnegan, Henderson, Farabow, Garrett & Dunner, LLP

(57) ABSTRACT

A first fuel addition valve disposed in a portion of a first exhaust passage upstream from a first upstream purification device, a first urea addition valve disposed in a portion of the first exhaust passage between the first upstream purification device and a first downstream purification device, and a first valve cooling passage configured such that i) refrigerant passes the first urea addition valve and the first fuel addition valve in order, and ii) the refrigerant cools the first fuel addition valve after the refrigerant cools the first urea addition valve.

14 Claims, 11 Drawing Sheets

(56) References Cited

U.S. PATENT DOCUMENTS

| | | | | |
|---|---|---|---|---|
| 2015/0128575 A1* | 5/2015 | Schmitt | ............... | F01N 3/2066 60/286 |
| 2018/0001258 A1* | 1/2018 | Kim | ..................... | B01D 53/56 |

* cited by examiner

EXHAUST GAS CONTROL SYSTEM

INCORPORATION BY REFERENCE

The disclosure of Japanese Patent Application No. 2016-129884 filed on Jun. 30, 2016 including the specification, drawings and abstract is incorporated herein by reference in its entirety.

BACKGROUND

1. Technical Field

The present disclosure relates to an exhaust gas control system for an internal combustion engine.

2. Description of Related Art

A system known as an exhaust gas control system for an internal combustion engine includes: an oxidation catalyst disposed in an exhaust passage of the internal combustion engine; a selective catalytic; reduction (SCR) catalyst disposed in a portion of the exhaust passage downstream from the oxidation catalyst; a fuel addition valve disposed in a portion of the exhaust passage upstream from the oxidation catalyst, the fuel addition valve being configured to add fuel to the exhaust gas; and a urea addition valve disposed in a portion of the exhaust passage between the fuel addition valve and the SCR catalyst, the urea addition valve being configured to add a urea aqueous solution to the exhaust gas (see, for example, Japanese Patent Application Publication No. 2012-097729).

SUMMARY

When the fuel addition valve or the urea addition valve is exposed to high-temperature exhaust gas, the fuel or the urea aqueous solution stagnating around the nozzle hole of the fuel addition valve or the urea addition valve is overheated to the temperature that causes deterioration of the fuel or the urea aqueous solution. This may induce undesirable situations such as operation failure of the fuel addition valve or the urea addition valve. As a solution to this problem, methods for cooling the fuel addition valve and the urea addition valve using refrigerant, such as cooling water and lubricant oil, may be considered.

The cooling methods may include a method in which the fuel addition valve and the urea addition valve are cooled with cooling circuits independent of each other. The method, however, involves complicated piping of the refrigerant, which causes a problem of deteriorated on-vehicle mountability. Accordingly, when the on-vehicle mountability of the exhaust gas control system including the cooling circuits are taken into consideration, it can be said that the fuel addition valve and the urea addition valve are desirably cooled in a shared cooling circuit, in this case, since the fuel addition valve is disposed in a portion of the exhaust passage upstream from the urea addition valve, the fuel addition valve is predicted to be more often exposed to high-temperature atmosphere than the urea addition valve. Accordingly, a cooling circuit configuration method may be considered to cool the fuel addition valve in preference to the urea addition valve. However, urea aqueous solution tends to deteriorate at temperature lower than fuel, and therefore when the fuel addition valve is cooled in preference to the urea addition valve, the urea aqueous solution stagnating around the nozzle hole of the urea addition valve is overheated to the urea aqueous solution deterioration temperature. This may induce operation failure of the urea addition valve.

The present disclosure provides a technology for an exhaust gas control system including a fuel addition valve and a urea addition valve, the technology being capable of suppressing overheating of the urea addition valve while cooling the fuel addition valve.

An example aspect of the present disclosure includes an exhaust gas control system. The exhaust gas control system includes: an oxidation catalyst disposed in an exhaust passage of a compression ignition type internal combustion engine operated to perform lean combustion; a Selective Catalytic Reduction (SCR) catalyst disposed in a portion of the exhaust passage downstream from the oxidation catalyst; a fuel addition valve disposed in a portion of the exhaust passage upstream from the oxidation catalyst; and a urea addition valve disposed in a portion of the exhaust passage between the oxidation catalyst and the SCR catalyst. The exhaust gas control system is configured such that refrigerant first cools the urea addition valve and then cools the fuel addition valve subsequent to the urea addition valve.

The exhaust gas control system includes a first upstream purification device disposed in a first exhaust passage of an internal combustion engine that is a compression ignition engine, the internal combustion engine configured to be operated to perform lean combustion, the first upstream purification device including an oxidation catalyst, a first downstream purification device disposed in a portion of the first exhaust passage downstream from the first upstream purification device, the first downstream purification device including a selective catalytic reduction catalyst; a first fuel addition valve disposed in a portion of the first exhaust passage upstream from the first upstream purification device, the first fuel addition valve configured to add fuel into exhaust gas; a first urea addition valve disposed in a portion of the first exhaust passage between the first upstream purification device and the first downstream purification device, the first urea addition valve configured to add urea aqueous solution into the exhaust gas; and a first valve cooling passage configured such that i) refrigerant passes the first urea addition valve and the first fuel addition valve in order, and ii) the refrigerant cools die first fuel addition valve after the refrigerant cools the first urea addition valve.

According to the cooling device configured in this way, the urea addition valve is cooled in a preferential manner, the urea addition valve being configured to add the urea aqueous solution which tends to deteriorate at lower temperature than the fuel added from the fuel addition valve. Accordingly, it becomes possible to prevent the urea addition valve from being overheated to the temperature that causes deterioration of the urea aqueous solution.

As described in the foregoing, when the urea addition valve is disposed downstream from the upstream purification device, it is assumed that the urea addition valve is exposed to the exhaust gas whose temperature is increased by reaction heat generated when unburned fuel components (fuel components not burned in the internal combustion engine) discharged from the internal combustion engine is oxidized by the oxidation catalyst of the upstream purification device. It is also assumed that, for warming the SCR catalyst of the downstream purification device or other purposes, treatment involving supply of fuel from the fuel addition valve to the upstream purification device is executed to actively increase the amount of reaction heat generated in the oxidation catalyst of the upstream purification device. Also in such a case, the urea addition valve is exposed to the exhaust gas having higher temperature. However, since the cooling device of the present disclosure cools the urea addition valve in preference to the fuel addition valve, it becomes possible to preferably prevent the urea addition valve from being overheated to the temperature where the urea aqueous solution deteriorates, even in the situations where the urea addition valve is exposed to the exhaust gas whose temperature increases due to various factors described before.

The aforementioned cooling device is configured such that the refrigerant cools the fuel addition valve subsequent to the urea addition valve. Therefore, no cooling objects other than the urea addition valve and the fuel addition valve are disposed between the urea addition valve and the fuel addition valve. Accordingly, the temperature at the time when the refrigerant reaches the fuel addition valve can be suppressed as low as possible. As a result, it also becomes possible to prevent the fuel addition valve from being overheated to the temperature that causes deterioration of the fuel.

Therefore, according to the cooling device of the present disclosure, it becomes possible to prevent the urea addition valve from being overheated to the temperature that causes deterioration of the urea aqueous solution, while also preventing the fuel addition valve from being overheated to the temperature that causes deterioration of fuel.

Next, the upstream purification device may include not only an oxidation catalyst but also a particulate filter that collects PM in exhaust gas. In the exhaust gas control system configured in this way, when it is estimated that the amount of PM accumulated in the particulate filter becomes equal to or greater than a specified threshold, treatment (referred to as "filter regeneration treatment" below) involving supply of fuel from the fuel addition valve to the oxidation catalyst is executed to heat the particulate filter to a PM oxidabie temperature using the reaction heat of fuel and to thereby oxidize and eliminate PM accumulated on the particulate filter. When such a filter regeneration treatment is executed, the urea addition valve is exposed to the exhaust gas having higher temperature. On the contrary, the cooling device according to the present disclosure is configured such that the refrigerant cools the urea addition valve in preference to the fuel addition valve as described before. Accordingly, even when the aforementioned filter regeneration treatment is executed, it becomes possible to prevent the urea addition valve from being overheated to the temperature that causes deterioration of the urea aqueous solution.

Here, in internal combustion engines such as V-type internal combustion engines and in-line multiple cylinder internal combustion engines, the exhaust gas control system may be divided into two systems. The exhaust gas control system further may include: a second upstream purification device disposed in a second exhaust passage of the internal combustion engine operated to perform lean combustion; a second downstream purification device disposed in a portion of the second exhaust passage downstream from the second upstream purification device; a second fuel addition valve disposed in a portion of the second exhaust passage upstream from the second upstream purification device; a second urea addition valve disposed in a portion of the second exhaust passage between the second upstream purification device and the second downstream purification device; and a second valve cooling passage configured such that the refrigerant cools the second fuel addition valve subsequent to the second urea addition valve. Such a configuration makes it possible, to suppress overheating of two urea addition valves while suppressing overheating of two fuel addition valves, even when two exhaust gas control systems are provided.

In internal combustion engines such as V-type internal combustion engines and in-line multiple cylinder internal combustion engines, part of the exhaust gas control system may be divided into two systems. An example aspect of the present disclosure includes an exhaust gas control system including: a first exhaust passage; a second exhaust passage; a third exhaust passage connecting to a confluence of the first exhaust passage and the second exhaust passage; a first upstream purification device disposed in the first exhaust passage of an internal combustion engine that is a compression ignition engine, the internal combustion engine configured to be operated to perform lean combustion; a second upstream purification device disposed in the second exhaust passage of the internal combustion engine; a first downstream purification device disposed in the third exhaust passage; a first fuel addition valve disposed in a portion of the first exhaust passage upstream from the first upstream purification device; a second fuel addition valve disposed in a portion of the second exhaust passage upstream from the second upstream purification device; a first urea addition valve disposed in the third exhaust passage upstream from the first downstream purification device; a first valve cooling passage configured such that refrigerant passes the first urea addition valve a second valve cooling passage configured such that a part of the refrigerant that has passed the first urea addition valve passes the first fuel addition valve; and a third valve cooling passage configured such that the remaining part of the refrigerant that has passed the first urea addition valve passes the second fuel addition valve, and the first valve cooling passage, the second valve cooling passage and the third valve cooling passage being configured such that i) the part of the refrigerant that has cooled the first urea addition valve cools the first fuel addition valve subsequent to the first urea addition valve, and ii) the remaining part of the refrigerant cools the second fuel addition valve subsequent to the first urea addition valve. Such configuration makes it possible to suppress overheating of the urea addition valve while suppressing overheating of the two fuel addition valves, even when part of the exhaust gas control system is divided into two systems.

Next, when the internal combustion engine according to the present disclosure is an internal combustion engine cooled with the refrigerant, the internal combustion engine including a radiator that radiates heat of the refrigerant that flowed through the internal combustion engine, the valve cooling passage may be configured such that some of the refrigerant after flowing through the radiator and before flowing through the internal combustion engine flows through the urea addition valve and the fuel addition valve in order. Such a configuration makes it possible to more reliably suppress the temperature of the refrigerant when the refrigerant flows through the urea addition valve and the fuel addition valve low. As a result, overheating of the fuel addition valve and the urea addition valve can be suppressed more reliably.

The internal combustion engine may be configured to be cooled with the refrigerant, the internal combustion engine including a radiator configured to radiate heat of the refrigerant that flowed through the internal combustion engine, the first valve cooling passage may be configured such that the refrigerant that has passed the first urea addition valve and the first fuel addition valve and the refrigerant that has passed the internal combustion engine and that has not passed the radiator converge with each other. According to such a configuration, the refrigerant heated by the heat of the urea addition valve arid the fuel addition valve flows into the radiator without flowing through other cooling objects. As a result, it becomes possible to cool the urea addition valve and the fuel addition valve without deteriorating the cooling efficiency of other cooling objects.

The internal combustion engine may include an exhaust gas turbine turbocharger configured to be cooled with the refrigerant, the exhaust gas turbine turbocharger may be configured such that a centrifugal compressor is driven using exhaust gas energy of the internal combustion engine. The first valve cooling passage may be disposed in parallel with a passage in which the refrigerant passes the exhaust gas turbine turbocharger.

Here, since the exhaust gas turbine turbocharger is often disposed adjacent to the internal combustion engine, the temperature of the exhaust gas turbine turbocharger tends to increase. Therefore, when the valve cooling passage disposed in series with the channel in which the refrigerant passes the exhaust gas turbine turbocharger, a component member cooled first, out of the component members including the exhaust gas turbine turbocharger and a set of two addition valves, discharges heat to the refrigerant, and the discharged heat may affect the cooling efficiency of the component member cooled later. On the contrary, when the passage in which the refrigerant passes the exhaust gas turbine turbocharger is disposed in parallel with the valve cooling passage, it becomes possible to prevent the cooling efficiency of any one component member, out of the component members including the exhaust gas turbine turbocharger and a set of the two addition valves, from being affected by the heat of the other component member.

The present disclosure can suppress overheating of the urea addition valve while cooling the fuel addition valve.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Specific embodiments of the present disclosure will be described below with reference to the accompanying drawings. Note that sizes, materials, shapes, and relative arrangements of component members disclosed in the embodiments are not intended to restrict the technical scope of the present disclosure thereto unless otherwise specified.

Figure 1:
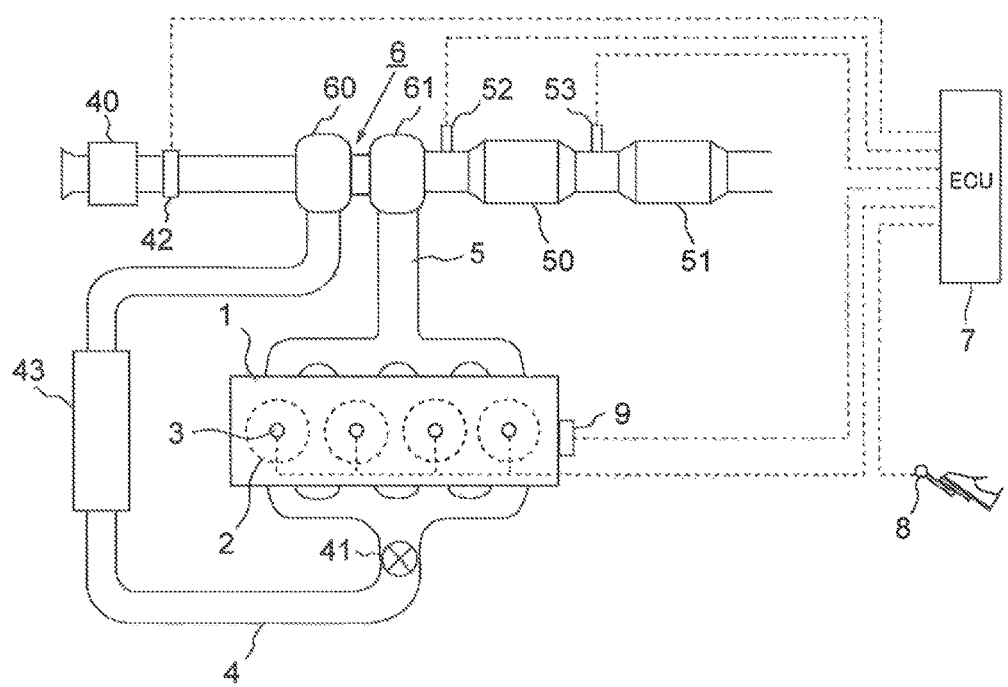
FIG. 1 illustrates a schematic configuration of an internal combustion engine and an intake and exhaust system thereof in a first embodiment.

First, the first embodiment of the present disclosure will be described with reference to FIGS. 1 through 4. FIG. 1 illustrates a schematic configuration of an internal combustion engine according to the present embodiment. The internal combustion engine 1 illustrated in FIG. 1 is a compression ignition type internal combustion engine (diesel engine) operated at an air-fuel ratio leaner than a theoretical air fuel ratio. In the example illustrated in FIG. 1, the internal combustion engine 1 has four cylinders 2 disposed in series. However, the internal combustion engine 1 may have three cylinders 2 or less, or may have five cylinders 2 or more. The cylinders 2 of the internal combustion engine 1 are each equipped with a fuel injection valve 3 that injects fuel into the cylinder 2.

The internal combustion engine 1 is connected to an intake passage 4. The intake passage 4 is a passage for guiding the air, which is taken in from the atmosphere, to each of the cylinders 2. In the vicinity of an upstream end of the intake passage 4, an air cleaner box 40 is attached for collecting dust and the like in the air. In a portion of the intake passage 4 downstream from the air cleaner box 40, a throttle valve 41 is attached for regulating the amount of air flowing through the intake passage 4. In a portion of the intake passage 4 between the throttle valve 41 and the air cleaner box 40, an air flowmeter 42 is attached to output an electrical signal correlated with the amount of air (the amount of intake air) flowing through the intake passage 4.

The internal combustion engine 1 is connected to an exhaust passage 5. The exhaust passage 5 is a passage for passing burned gas (exhaust gas) burned inside the cylinder 2. In some midpoint of the exhaust passage 5, an upstream casing 50 is disposed. The upstream casing 50 houses an oxidation catalyst formed from a honeycomb structured body carrying a noble metal (such as platinum, palladium, or rhodium), and a particulate filter. The upstream casing 50 corresponds to "upstream purification device" according to the present disclosure. In a portion of the exhaust passage 5 downstream from the upstream casing 50, a downstream casing 51 is disposed. The downstream casing 51 houses a SCR catalyst formed from a honeycomb structured body made of cordierite or Fe—Cr—Al-based heat resisting steel, a zeolite-based coat layer coating the honeycomb structured body, and a noble metal (such as platinum and palladium) carried on the coat layer. The downstream casing 51 corresponds to "downstream purification device" according to the present disclosure. In a portion of the exhaust passage 5 upstream from the upstream casing 50, a fuel addition valve 52 for adding fuel into exhaust gas is disposed. In a portion of the exhaust passage 5 between the upstream casing 50 and the downstream casing 51, a urea addition valve 53 is disposed for adding urea aqueous solution into exhaust gas.

The internal combustion engine 1 includes an exhaust gas turbine turbocharger (turbocharger) 6 that compresses intake air using thermal energy of exhaust gas. The turbocharger 6 includes a turbine 61 disposed in a portion of the exhaust passage 5 upstream from the fuel addition valve 52, and a compressor 60 disposed in a portion of the intake passage 4 between the air flowmeter 42 and the throttle valve 41. The turbine 61 converts the thermal energy of exhaust gas into kinetic energy. The compressor 60 is a centrifugal compressor driven by the kinetic energy output from the turbine 61 to compress the intake air. The intake air compressed and thereby heated by the compressor 60 is cooled by an intercooler 43 disposed in a portion of the intake passage 4 between the compressor 60 and the throttle valve 41. The intercooler 43 is a heat exchanger that radiates the heat of the intake air into the atmosphere or the cooling water.

The internal combustion engine 1 configured as described in the foregoing is annexed with an electronic control unit (ECU) 7. The ECU 7 is constituted of a CPU, a ROM, a RAM, a backup RAM, and the like. The thus-configured ECU 7 is electrically connected not only with the aforementioned air flowmeter 42 but also with various sensors such as an accelerator position sensor 8 and a crank position sensor 9. The accelerator position sensor 8 is a sensor that outputs an electrical signal correlated with an operation amount (accelerator opening) of an accelerator pedal. The crank position sensor 9 is a sensor that outputs an electrical signal correlated with a rotational position of an engine output shaft (crankshaft) of the internal combustion engine 1.

The ECU 7 is also electrically connected with various devices such as the fuel injection valve 3, the throttle valve 41, the fuel addition valve 52, and the urea addition valve 53 so as to be able to control the operating conditions of the various devices. For example, the ECU 7 calculates a target fuel injection amount based on an engine load calculated from an output signal of the accelerator position sensor 8 and on an engine rotation speed calculated based on an output signal of the crank position sensor 9, and controls the fuel injection valve 3 in accordance with the target fuel injection amount. Moreover, when the oxidation catalyst of the upstream casing 50 is in an active state and the SCR catalyst of the downstream casing 51 is in an inactive state, the ECU 7 executes treatment (which is referred to as "catalyst warming up treatment" below) to add fuel into exhaust gas from the fuel addition valve 52 so as to increase the temperature of the SCR catalyst of the downstream casing 51 to an active temperature using reaction heat generated when the fuel is oxidized with the oxidation catalyst. Furthermore, when it is estimated that the amount of PM accumulated on the particulate filter of the upstream casing 50 is equal to or greater than a specified threshold, the ECU 7 executes treatment (filter regeneration treatment) to add fuel into exhaust gas from the fuel addition valve 52 so as to increase the temperature of the particulate filter to a PM oxidable temperature using reaction heat generated when the fuel is oxidized with the oxidation catalyst. When the amount ($NH_3$ desorption amount) of ammonia ($NH_3$) adsorbed on the SCR catalyst of the downstream casing 51 reaches a target adsorption amount or less, the ECU 7 executes treatment (which is referred to as "reducing agent supply treatment" below) to add urea aqueous solution into exhaust gas from the urea addition valve 53. The urea aqueous solution added into exhaust gas from the urea addition valve 53 is pyrolyzed and hydrolyzed in the exhaust gas or in the SCR catalyst to form $NH_3$, and the formed $NH_3$ is adsorbed on the SCR catalyst. $NH_3$ adsorbed on the SCR catalyst reacts with $NO_X$ contained in exhaust gas, so that the $NO_X$ is reduced into nitrogen ($N_2$).

Here, when the fuel addition valve 52 or the urea addition valve 53 is exposed to high-temperature exhaust gas, the fuel stagnating in the vicinity of a nozzle hole of the fuel addition valve 52 or the urea aqueous solution stagnating in the vicinity of a nozzle hole of the urea addition valve 53 may be overheated to the temperature at which the fuel or the urea aqueous solution deteriorates. For example, when the fuel addition valve 52 is overheated, the fuel stagnating in the vicinity of the nozzle hole of the fuel addition valve 52 may deteriorate (for example, carbonize.), which may induce clogging of the nozzle hole of the fuel addition valve 52. When clogging of the nozzle hole of the fuel addition valve 52 occurs and the aforementioned catalyst warming up treatment or filter regeneration treatment are executed, it may become difficult to heat the SCR catalyst or the particulate filter to a desired temperature. When the urea addition valve 53 is overheated, the urea aqueous solution stagnating in the vicinity of the nozzle hole of the urea addition valve 53 may deteriorate into urea crystal, cyanuric acid, melanin, or the like, which may induce clogging of the nozzle hole of the urea addition valve 53. When clogging of the nozzle hole of the urea addition valve 53 occurs and the aforementioned reducing agent supply treatment is executed, it may become difficult to cause the $NH_3$ desorption amount of the SCR catalyst to reach a target adsorption amount. To solve these problems, in the present embodiment, the fuel addition valve 52 and the urea addition valve 53 are cooled with the cooling water of the internal combustion engine 1.

Figure 2:
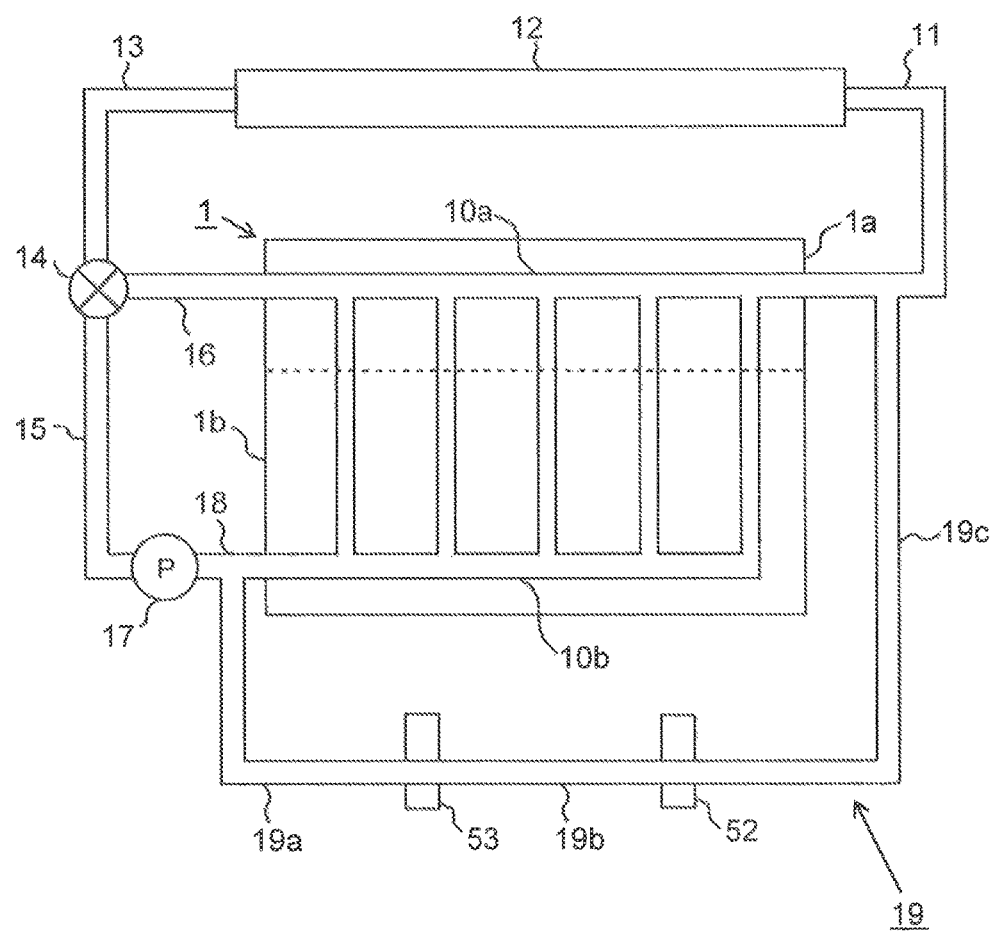
FIG. 2 illustrates the configuration of a cooling device in the first embodiment.

FIG. 2 illustrates the configuration of the cooling device of the present embodiment. The cooling device includes a head-side channel 10*a* formed in a cylinder head 1*a* of the internal combustion engine 1, and a block-side channel 10*b* formed in a cylinder block 1*b* of the internal combustion engine 1. The head-side channel 10*a* and the block-side channel 10*b* communicate with each other. The head-side channel 10*a* is connected to a cooling water inlet of a radiator 12 through a first channel 11. The radiator 12 is a heat exchanger that radiates heat of the cooling water into the atmosphere. The radiator 12 has a cooling water outlet connected to a thermostat valve 14 through a second channel 13. The thermostat valve 14 is connected not only to the second channel 13, but also to a third channel 15 and a bypass channel 16. The third channel 15 is connected to a suction port of a water pump 17. The water pump 17 has a discharge port connected to the block-side channel 10*b* through a fourth channel 18. The bypass channel 16 is connected to the head-side channel 10*a*.

Here, the thermostat valve 14 is a channel switching valve that blocks either the second channel 13 or the bypass channel 16 in accordance with the temperature of the cooling water. More specifically, when the temperature of the cooling water flowing through the thermostat valve 14 is less than a specified valve opening temperature (for example, 80° C. to 90° C.), the thermostat valve 14 blocks the second channel 13 while opening the bypass channel 16, so that the third channel 15 is connected to the bypass channel 16. When the temperature of the cooling water flowing the thermostat valve 14 is equal to the valve opening temperature or more, the thermostat valve 14 opens the second channel 13 while blocking the bypass channel 16, so that the third channel 15 is connected to the second channel 13.

Next, the fourth channel 18 has some midpoint connected to one end of a valve cooling passage 19. The other end of the valve cooling passage 19 is connected to some midpoint of the first channel 11 The valve cooling passage 19 is a passage for feeding cooling water to the urea addition valve 53 and the fuel addition valve 52 in series. Here, since the fuel addition valve 52 is disposed in a portion of the exhaust passage 5 upstream from the urea addition valve 53, the fuel addition valve 52 is more often exposed to high-temperature atmosphere than the urea addition valve 53. Accordingly, a method for constituting the channel so that the fuel addition valve 52 is cooled ahead of the urea addition valve 53 is considered. However, the urea aqueous solution tends to deteriorate at a temperature lower than the temperature at which fuel deteriorates. Accordingly, when the fuel addition valve 52 is cooled ahead of the urea addition valve 53, the urea addition valve 53 is cooled with the cooling water which received heat of the fuel addition valve 52. As a result, the urea addition valve 53 may be overheated to the temperature that causes deterioration of the urea aqueous solution. In the case where a large amount of reaction heat is generated from the oxidation catalyst, such as the case where the aforementioned catalyst warming up treatment or filter regeneration treatment is executed in particular, the urea addition valve 53 is exposed to the exhaust gas having high temperature. If the fuel addition valve 52 is cooled ahead of the urea addition valve 53 in this state, there is a high possibility that the urea addition valve 53 is overheated to the temperature that causes deterioration of the urea aqueous solution. Accordingly, the valve cooling passage 19 in the present embodiment is configured such that the cooling water cools the urea addition valve 53 first and then the cooling water cools the fuel addition valve 52 subsequent to the urea addition valve 53. The phrase "the cooling water cools the fuel addition valve 52 subsequent to the urea addition valve 53" herein signifies that no cooling objects other than these fuel addition valve 52 and urea addition valve 53 are disposed in a portion of the valve cooling passage 19 between the urea addition valve 53 and the fuel addition valve 52. Hereinafter, a portion of the valve cooling passage 19 between the fourth channel 18 and the urea addition valve 53 is referred to as a fifth channel 19a, a portion of the valve cooling passage 19 between the urea addition valve 53 and the fuel addition valve 52 is referred to as a sixth channel 19b, and a portion of the valve cooling passage 19 between the fuel addition valve 52 and the first channel 11 is referred to as a seventh channel 19c.

Figure 3:
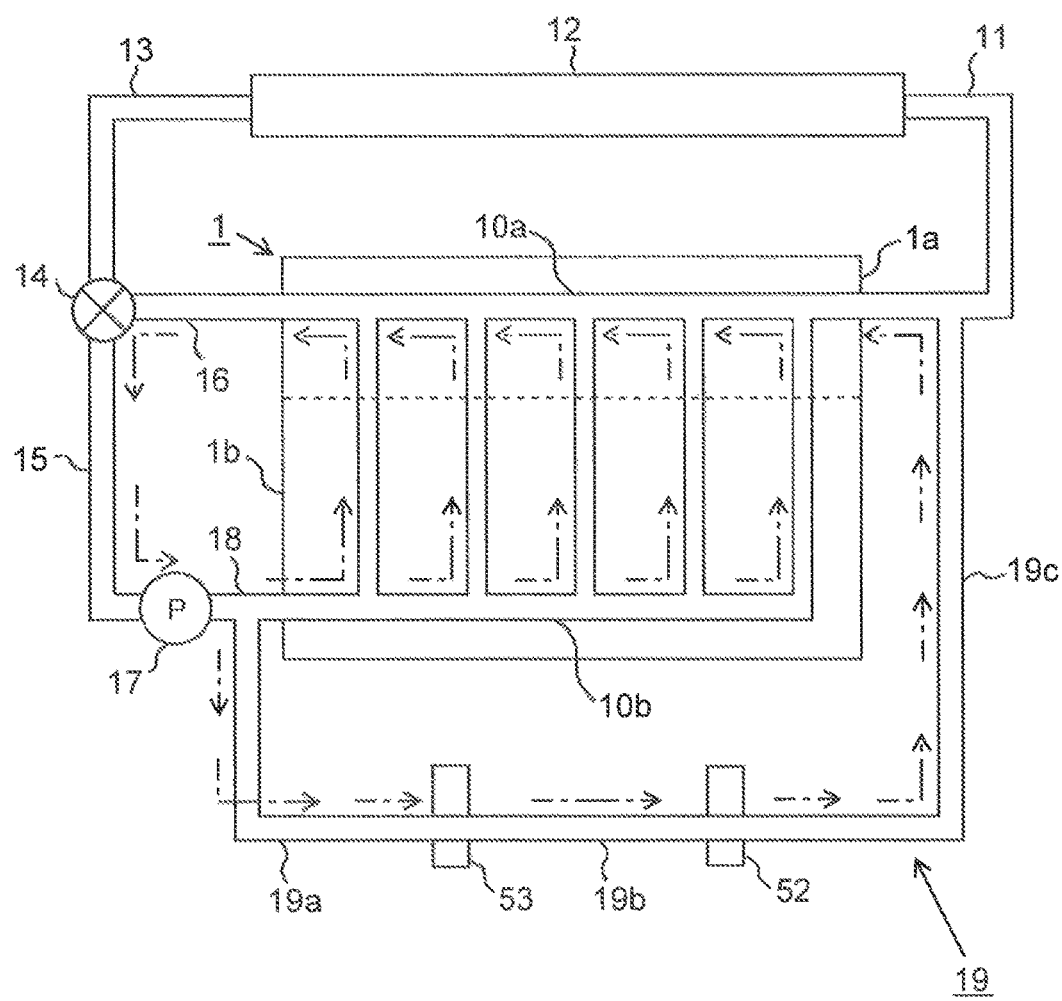
FIG. 3 illustrates the flow of cooling water when the temperature of the cooling water flowing through a thermostat valve is less than a valve opening temperature.
Figure 4:
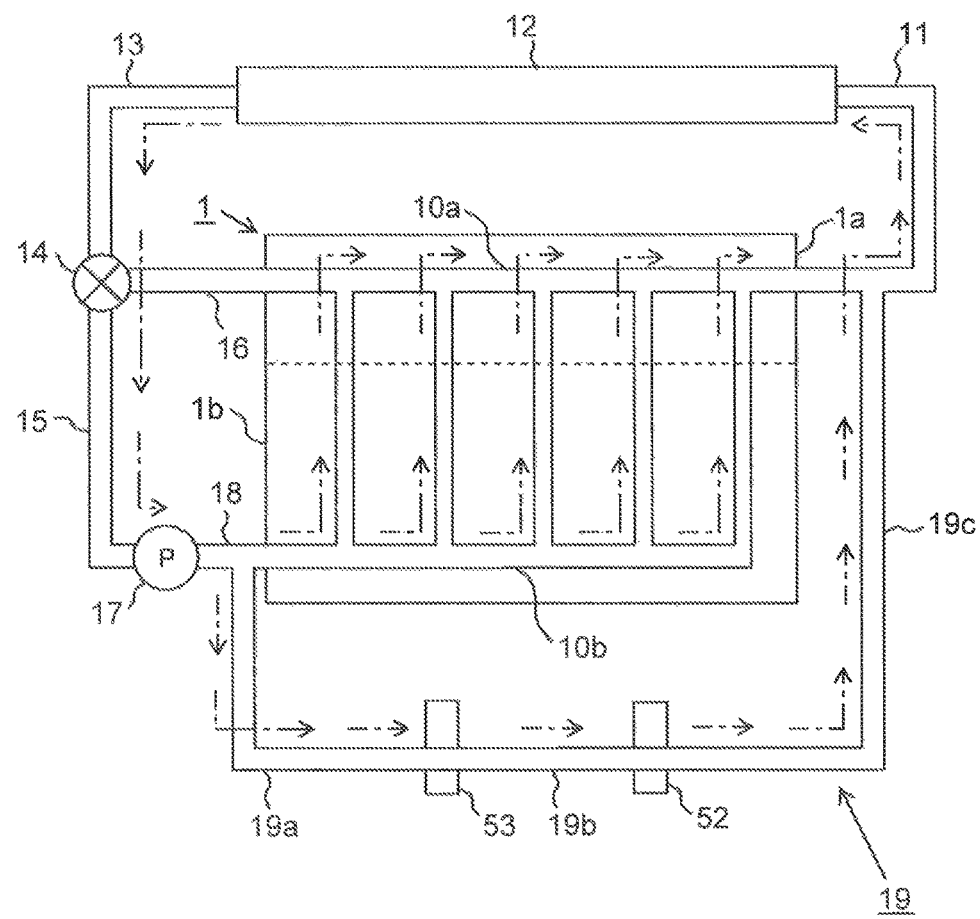
FIG. 4 illustrates the flow of cooling water when the temperature of the cooling water flowing through the thermostat valve is equal to or more than the valve opening temperature.

Hereinafter, the flow of the cooling water in the aforementioned cooling device is described with reference to FIGS. 3 and 4. FIG. 3 illustrates the flow of cooling water when the temperature of the cooling water flowing through the thermostat valve 14 is less than the valve opening temperature as in the case of the internal combustion engine 1 being in a cold state. When the temperature of the cooling water flowing through the thermostat valve 14 is lower than the valve opening temperature, the thermostat valve 14 is operated such that the second channel 13 is blocked, while the third channel 15 and the bypass channel 16 are connected as described before. As a result, a circuit is formed in which the cooling water discharged from the water pump 17 flows through the fourth channel 18, the block-side channel 10b, the head-side channel 10a, the bypass channel 16, the thermostat valve 14, and the third channel 15 in order, and returns to the water pump 17. When such a circuit is formed, the cooling water bypasses the radiator 12, which suppresses temperature decrease in the cooling water. As a result, unnecessary cooling of the internal combustion engine 1 is suppressed, and warming of the internal combustion engine 1 is promoted.

When the temperature of the cooling water flowing through the thermostat valve 14 is less than the valve opening temperature, not only the aforementioned circuit is formed, but also another circuit is formed in which the cooling water discharged from the water pump 17 flows through the fourth channel 18, the fifth channel 19a, the urea addition valve 53, the sixth channel 19b, the fuel addition valve 52, the seventh channel 19c, the first channel 11, the head-side channel 10a, the bypass channel 16, the thermostat valve 14, and the third channel 15 in order, and returns to the water pump 17. Here, when the temperature of the cooling water flowing through the thermostat valve 14 is less than the valve opening temperature, it is estimated that the temperature of the fuel addition valve 52 and the urea addition valve 53 is also low. When the temperature of the fuel addition valve 52 and the urea addition valve 53 is low, it becomes hard for the fuel added into exhaust gas from the fuel addition valve 52 and the urea aqueous solution added into exhaust gas from the urea addition valve 53 to atomize. In this case, if the circuit as illustrated in FIG. 3 is formed, the fuel addition valve 52 and the urea addition valve 53 are warmed with the cooling water whose temperature is increased by the heat of the internal combustion engine 1. As a result, it becomes easy for the fuel added into exhaust gas from the fuel addition valve 52 and the urea aqueous solution added into exhaust gas from the urea addition valve 53 to atomize, Next, FIG. 4 illustrates the flow of cooling water when the temperature of the cooling water flowing through the thermostat valve 14 is equal to or more than the valve opening temperature as in the case of the internal combustion engine 1 being in a warming-up completed state. When the temperature of the cooling water flowing through the thermostat valve 14 is equal to or greater than the valve opening temperature, the thermostat valve 14 is operated such that the bypass channel 16 is blocked, while the second channel 13 and the third channel 15 are connected as described before. Accordingly, a circuit is formed in which the cooling water discharged from the water pump 17 flows through the fourth channel 18, the block-side channel 10b, the head-side channel 10a, the first channel 11, the radiator 12, the second channel 13, the thermostat valve 14, and the third channel 15 in order, and returns to the water pump 17. When such a circuit is formed, the cooling water heated through the block-side channel 10b and the head-side channel 10a flows through the radiator 12, where the heat of the cooling water is radiated. Accordingly, the cooling water having a relatively low-temperature after radiating heat in the radiator 12 flows into the head-side channel 10a and the block-side channel 10b, so that the internal combustion engine 1 is suitably cooled. As a result, overheating of the internal combustion engine 1 is suppressed.

When the temperature of the cooling water flowing through the thermostat valve 14 is more than the valve opening temperature. Not only the aforementioned circuit is formed, but also another circuit is formed in which the cooling water pumped out from the water pump 17 flows through the fourth channel 18, the fifth channel 19a, the urea addition valve 53, the sixth channel 19b, the fuel addition valve 52, the seventh channel 19c, the first channel 11, the radiator 12, the second channel 13, the thermostat valve 14, and the third channel 15 in order, and returns to the water pump 17. When such a circuit is formed, low-temperature cooling water after radiating heat in the radiator 12 and before flowing into the block-side channel 10b cools the urea addition valve 53 and the fuel addition valve 52 in order. Here, when the temperature of the cooling water flowing through the thermostat valve 14 is equal to or greater than the valve opening temperature, the fuel addition valve 52 and the urea addition valve 53 are exposed to the exhaust gas having high temperature in comparison with a case where the temperature of the cooling water flowing through the thermostat valve 14 is less than the valve opening temperature. Accordingly, the temperature of the fuel addition valve 52 and the urea addition valve 53 tend to increase. When the temperature of the fuel addition valve 52 and the urea addition valve 53 tends to increase, the temperature increase in these fuel addition valve 52 and the urea addition valve 53 is suppressed by cooling the fuel addition valve 52 and the urea addition valve 53 with the low-temperature cooling water after radiating heat in the radiator 12 and before flowing into the block-side channel 10b as described before. The valve cooling passage 19 in the present embodiment in particular is configured to preferentially cool the urea addition valve 53 that adds the urea aqueous solution that tends to deteriorate at lower temperature than the fuel added from the fuel addition valve 52. Accordingly, it becomes possible to prevent the urea addition valve 53 from being overheated to the temperature that causes deterioration of the urea aqueous solution. Moreover, the valve cooling passage 19 in the present embodiment is configured such that no cooling objects other than these two addition valves are disposed between the urea addition valve 53 and the fuel addition valve 52. Accordingly, it becomes possible to suppress the temperature of the cooling water flowing through the fuel addition valve 52 as low as possible. As a result, it also becomes possible to prevent the fuel addition valve 52 from being overheated to the temperature that causes deterioration of the fuel.

Therefore, the cooling device of the present embodiment can suppress overheating of the urea addition valve 53 while suppressing overheating of the fuel addition valve 52. Since the valve cooling passage 19 in the present embodiment is configured such that the cooling water flows through the urea addition valve 53 and the fuel addition valve 52 in series, it becomes possible to suppress deterioration in on-vehicle mountability of the cooling device as compared with the configuration in which cooling water flows through the fuel addition valve 52 and the urea addition valve 53 in parallel.

In the present embodiment, the cooling water of the internal combustion engine 1 is used as refrigerant for cooling the fuel addition valve 52 and the urea addition valve 53. However, other refrigerants such as lubricant oil of the internal combustion engine 1 or a gear transmission may also be used. In that case, low-temperature lubricant oil after flowing through an oil cooler that radiates heat of the lubricant oil to the atmosphere or to the cooling water and before flowing through a lubrication target may be fed to the urea addition valve 53 and the fuel addition valve 52 in order.

When the turbocharger 6 is a water cooling-type turbocharger cooled with the cooling water of the internal combustion engine 1, and a passage in which the cooling water passes the turbocharger 6 is disposed in series with the valve cooling passage 19, the cooling efficiency of the turbocharger 6 may possibly be degraded, or the cooling efficiency of the fuel addition valve 52 and the urea addition valve 53 may possibly be degraded.

For example, when the valve cooling passage 19 is disposed in series with a downstream portion of the passage in which the cooling water passes the turbocharger 6, the fuel addition valve 52 and the urea addition valve 53 are cooled with the cooling water having high temperature due to the heat received from the turbocharger 6. Accordingly, the amount of heat radiated from the fuel addition valve 52 and the urea addition valve 53 to the cooling water decreases, which degrades the cooling efficiency of the fuel addition valve 52 and the urea addition valve 53. As a result, the fuel addition valve 52 may he overheated to the temperature that causes deterioration of fuel, or the urea addition valve 53 may be overheated to the temperature that causes deterioration of the urea aqueous solution.

When the valve cooling passage 19 is disposed in series with an upstream portion of the passage in which the cooling water passes the turbocharger 6, the turbocharger 6 is cooled with the cooling water having high temperature due to the heat received from the fuel addition valve 52 and the urea addition valve 53. As a result, the cooling efficiency of the turbocharger 6 is degraded. This may cause rotation failure of a shaft that couples a turbine wheel of the turbocharger 6 and a compressor wheel.

Figure 5:
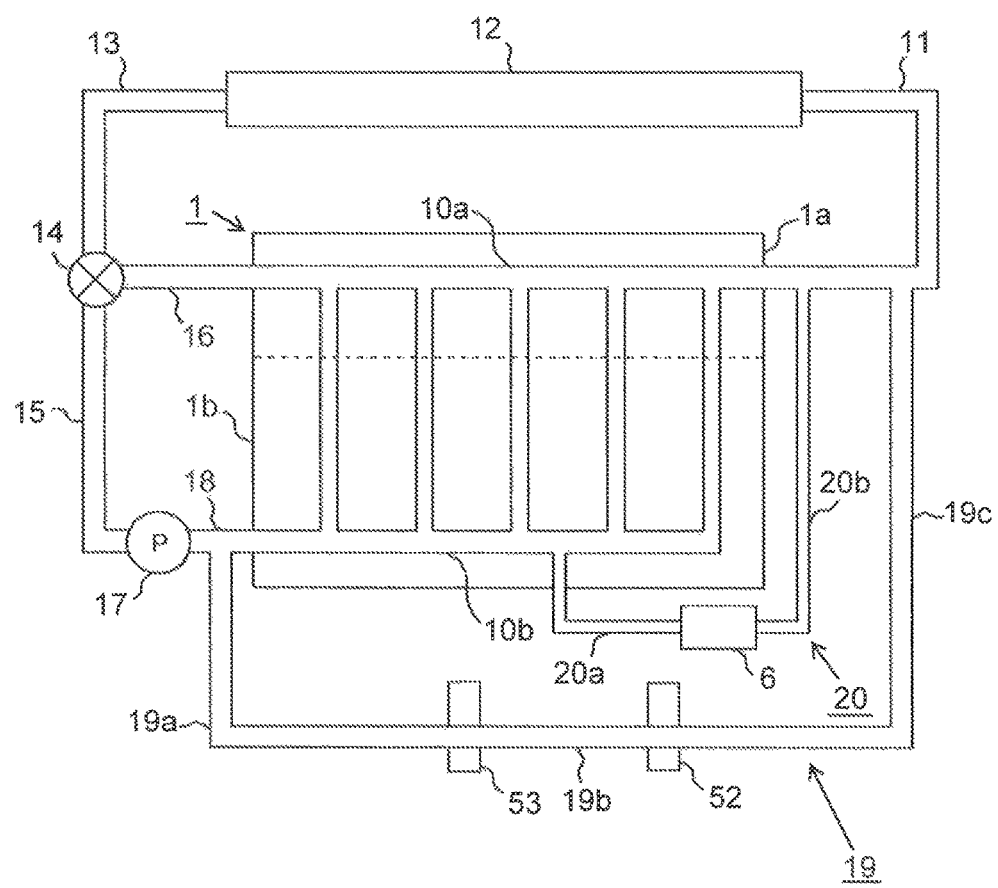
FIG. 5 illustrates the configuration of a cooling device in a first modification of the first embodiment.

In such circumstances, in a present modification, the passage in which the cooling water passes the turbocharger 6 is disposed in parallel with the valve cooling passage 19 when the turbocharger 6 is a water cooling-type turbocharger. FIG. 5 illustrates the configuration of a cooling device of the present modification. In FIG. 5, component members similar to those in the first embodiment described before are designated by similar reference signs.

As illustrated in FIG. 5, the passage (which is referred to as "TC channel" below) 20 in which the cooling water passes the turbocharger 6 is constituted of an eighth channel 20a branching from some midpoint of the block-side channel 10b and extending to the turbocharger 6, and a ninth channel 20b extending from the turbocharger 6 and converging with some midpoint of the first channel 11. According to such a configuration, since the TC channel 20 is disposed in parallel with the valve cooling passage 19, it becomes possible to suppress degradation in the cooling efficiency of the turbocharger 6, and degradation in the cooling efficiency of the fuel addition valve 52 and the urea addition valve 53.

The valve cooling passage 19 is also disposed in parallel with passages that carry the cooling water flowing through water cooling-type auxiliary machines (such as a water cooling-type oil cooler) other than the turbocharger 6. In other words, no cooling objects (such as the turbocharger 6 and the water-cooled oil cooler) other than two addition valves are disposed in a route extending from the water pump 17 and through the fourth channel 18, the valve cooling passage 19, and the first channel 11 to the cooling water inlet of the radiator 12. According to such a configuration, it becomes possible to cool the fuel addition valve 52 and the urea addition valve 53, without affecting the cooling efficiency of the cooling objects other than two addition valves.

In the first embodiment described before, the fuel addition valve 52 and the urea addition valve 53 are cooled with the cooling water taken out from some midpoint of the fourth channel 18. However, the fuel addition valve 52 and the urea addition valve 53 may be cooled with the cooling water taken out from some midpoint of the block-side channel 10b. More specifically, as illustrated in FIG. 6, one end (an upstream end of the fifth channel 19a) of the valve cooling passage 19 may be connected to some midpoint of the block-side channel 10b.

Figure 6:
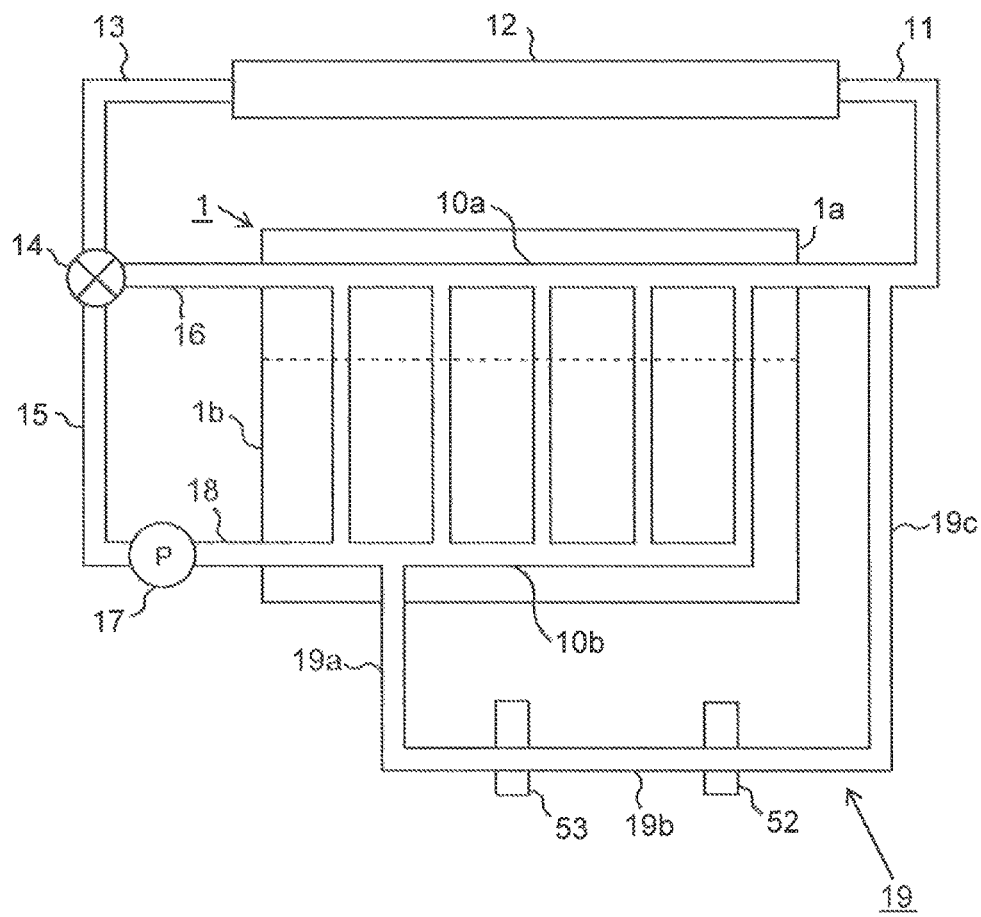
FIG. 6 illustrates the configuration of a cooling device in a second modification of the first embodiment.

According to the configuration illustrated in FIG. 6, the cooling water after radiating heat in the radiator 12 is heated by the heat of the cylinder block 1b to some extent. In this state, the cooling water cools the fuel addition valve 52, and the urea addition valve 53. As a consequence, the cooling device configured as illustrated in FIG. 6 may be suitable when at least the urea addition valve 53, out of the fuel addition valve 52 and the urea addition valve 53, is disposed at a position distanced from the internal combustion engine 1 (for example, a position exposed to running wind on the bottom face of the vehicle). Assume the case where low-temperature cooling water after radiating heat in the radiator 12 and before flowing into the block-side channel 10b cook the urea addition valve 53 as described in the first embodiment when the urea addition valve 53 is disposed in a position distanced from the internal combustion engine 1, in this case, the urea addition valve 53 may excessively be cooled to the temperature that induces precipitation of urea due to a synergetic effect of the cooling effect by the low-temperature cooling water and the cooling effect by the running wind. Meanwhile, when the urea addition valve 53 is cooled with the cooling water whose temperature is increased to some extent due to the heat received from the cylinder block 1b as illustrated in FIG. 6, it becomes possible to suppress overcooling of the urea addition valve 53. However, when the urea addition valve 53 is cooled with the cooling water whose temperature is increased to some extent due to the heat received from the cylinder block 1b, and the aforementioned catalyst warming up treatment and filter regeneration treatment are executed in this state, there is a risk of the urea addition valve 53 being overheated. However, since the block-side channel 10b is a portion that carries a large amount of the cooling water as compared with other channels, it is possible to take out a relatively large amount of the cooling water from the block-side channel 10b to the valve cooling passage 19. That is, the amount of cooling water flowing through the urea addition valve 53 per unit time can be made relatively large. Therefore, it becomes possible to suppressing overcooling of the urea addition valve 53, while suppressing overheating of the urea addition valve 53.

Now, a second embodiment of the present disclosure will be described with reference to FIGS. 7 and 8. Here, configuration aspects other than those described in the first embodiment will be described, while description of similar configuration aspects is omitted.

In the aforementioned first embodiment, the exhaust gas control system for an internal combustion engine has one system. However, in the present embodiment, the exhaust gas control system for an internal combustion engine is divided into two systems. FIG. 7 illustrates a schematic configuration of an internal combustion engine and an exhaust system thereof in the present embodiment. In FIG. 7, component members similar to those in the first embodiment described before are designated by similar reference signs.

Figure 7:
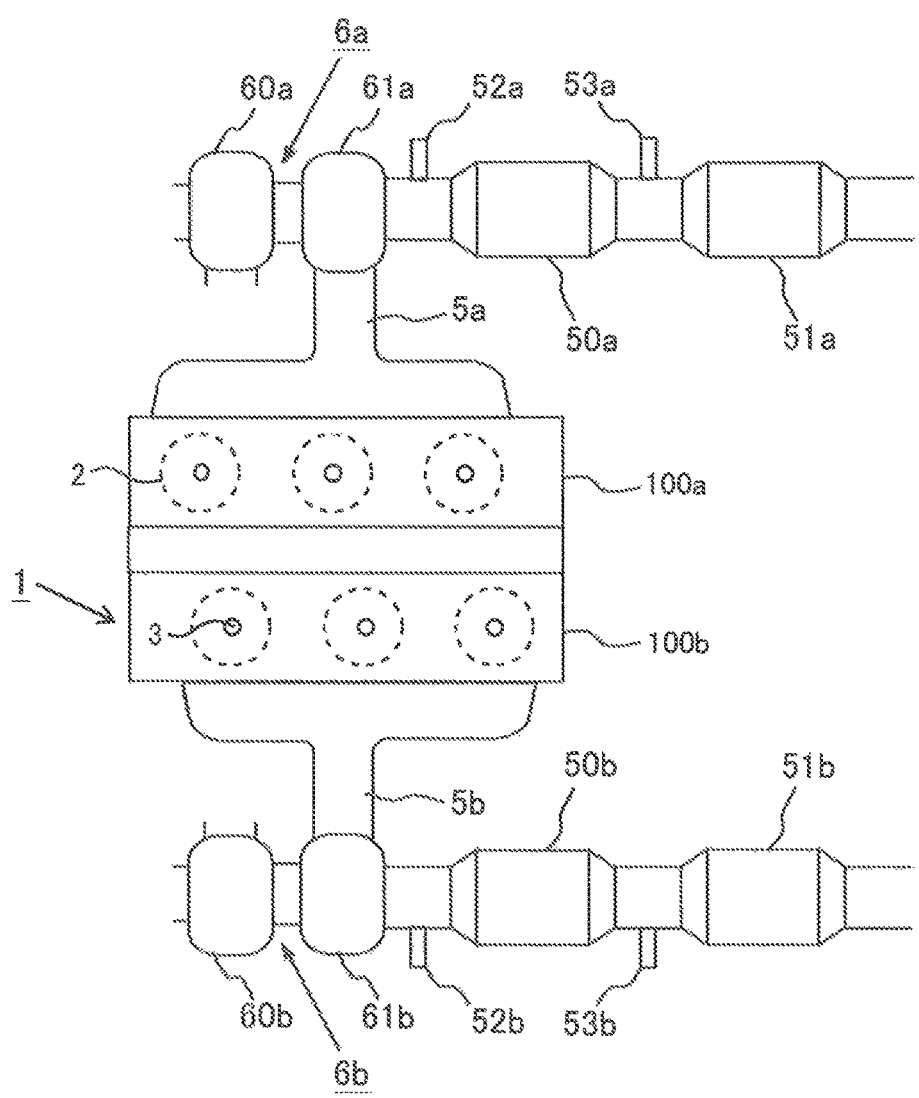
FIG. 7 illustrates a schematic configuration of an internal combustion engine and an exhaust system thereof in a second embodiment.

The internal combustion engine 1 illustrated in FIG. 7 includes two cylinder blocks (banks) 100a, 100b disposed in a V-shape. In the example illustrated in FIG. 7, the banks 100a, 100b are each provided with three cylinders 2. However, the banks 100a, 100b may each be provided with two cylinders 2 or less, or four cylinders 2 or more.

One of the two banks 100a, 100b, bank 100a (which is referred to as "first bank 100a" below) is connected to a first exhaust passage 5a. In the course of the first exhaust passage 5a, a turbine 61a of a first turbocharger 6a, a first fuel addition valve 52a, a first upstream casing 50a, a first urea addition valve 53a, and a first downstream casing 51a are disposed in order from an upstream side in a flow direction of exhaust gas.

The other bank 100b (which is referred to as "second bank 100b" below) out of the two banks 100a, 100b is connected to a second exhaust passage 5b. In the course of the second exhaust passage 5b, a turbine 61b of a second turbochargers 6b, a second fuel addition valve 52b, a second upstream casing 50b, a second urea addition valve 53b, and a second downstream casing 51b are disposed in order from an upstream side in the flow direction of the exhaust gas.

A portion of the first exhaust passage 5a downstream from the first downstream casing 51a and a portion of the second exhaust passage 5b downstream from the second downstream casing 51b may converge with each other or may be independent of each other until they reach a tail end (atmosphere release end).

Here, the first upstream casing 50a and the second upstream casing 50b house an oxidation catalyst and a particulate filter like the upstream casing 50 in the first embodiment described before. The first downstream casing 51a and the second downstream casing 51b house a SCR catalyst like the downstream casing 51 in the first embodiment described before.

A reference sign 60a in FIG. 7 designates a compressor of the first turbocharger 6a. A reference sign 60b in FIG. 7 designates a compressor of the second turbochargers 6b.

Figure 8:
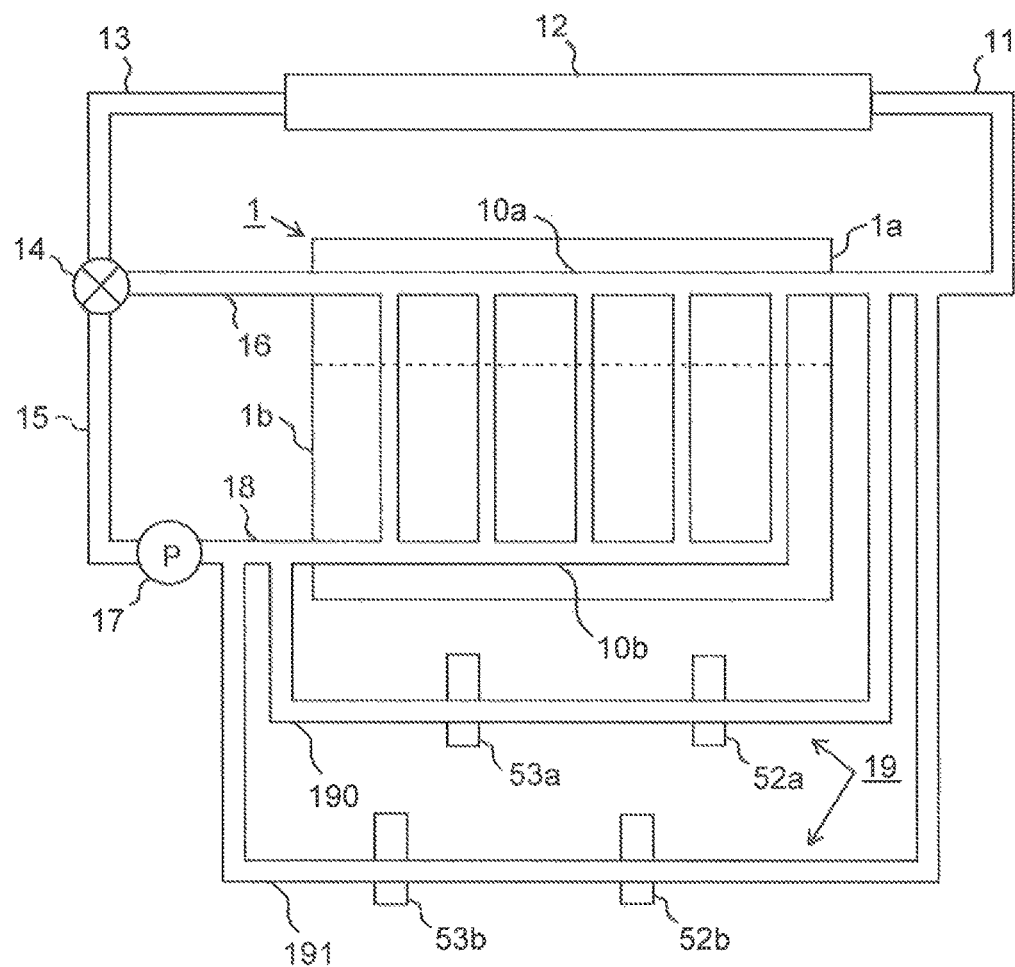
FIG. 8 illustrates the configuration of a cooling device in the second embodiment.

Next, FIG. 8 illustrates the configuration of a cooling device of the present embodiment. In FIG. 8, component members similar to those in the first embodiment described before are designated by similar reference signs. The valve cooling passage 19 in the present embodiment includes a first valve cooling passage 190, and a second valve cooling passage 191 disposed in parallel with the first valve cooling passage 190. The first valve cooling passage 190 is a channel branching from some midpoint of the fourth channel 18 and extending through the first urea addition valve 53a and the first fuel addition valve 52a in order before converging with some midpoint of the first channel 11. In this case, the first valve cooling passage 190 is configured such that the cooling water taken out from the fourth channel 18 cools the first urea addition valve 53a first and then the cooling water cools the first fuel addition valve 52a subsequent to the first urea addition valve 53a. That is, the first valve cooling passage 190 is configured such that no cooling objects other than these first urea addition valves 53a and first fuel addition valve 52a are disposed between the first urea addition valve 53a and the first fuel addition valve 52a. The second valve cooling passage 191 is a channel branching from some midpoint of the fourth channel 18 and extending through the second urea addition valve 53b and the second fuel addition valve 52b in order before converging with some midpoint of the first channel 11. In this case, the second valve cooling passage 191 is configured such that the cooling water taken out from the fourth channel 18 cools the second urea addition valve 53b first and then the cooling water cools the second fuel addition valve 52b subsequent to the second urea addition valve 53b. That is, the second valve cooling passage 191 is configured such that no cooling objects other than these second urea addition valves 53b and second fuel addition valve 52b are disposed between the second urea addition valve 53b and the second fuel addition valve 52b.

According to the valve cooling passage 19 configured as illustrated in FIG. 8, it becomes possible to suppress overheating of the urea addition valves 53a, 53b while suppressing overheating of the fuel addition valves 52a, 52b as in the first embodiment described before.

In the second embodiment described before, the exhaust gas control system is divided into two systems. However, in the present modification, part of the exhaust gas control system is divided into two systems.

Figure 9:
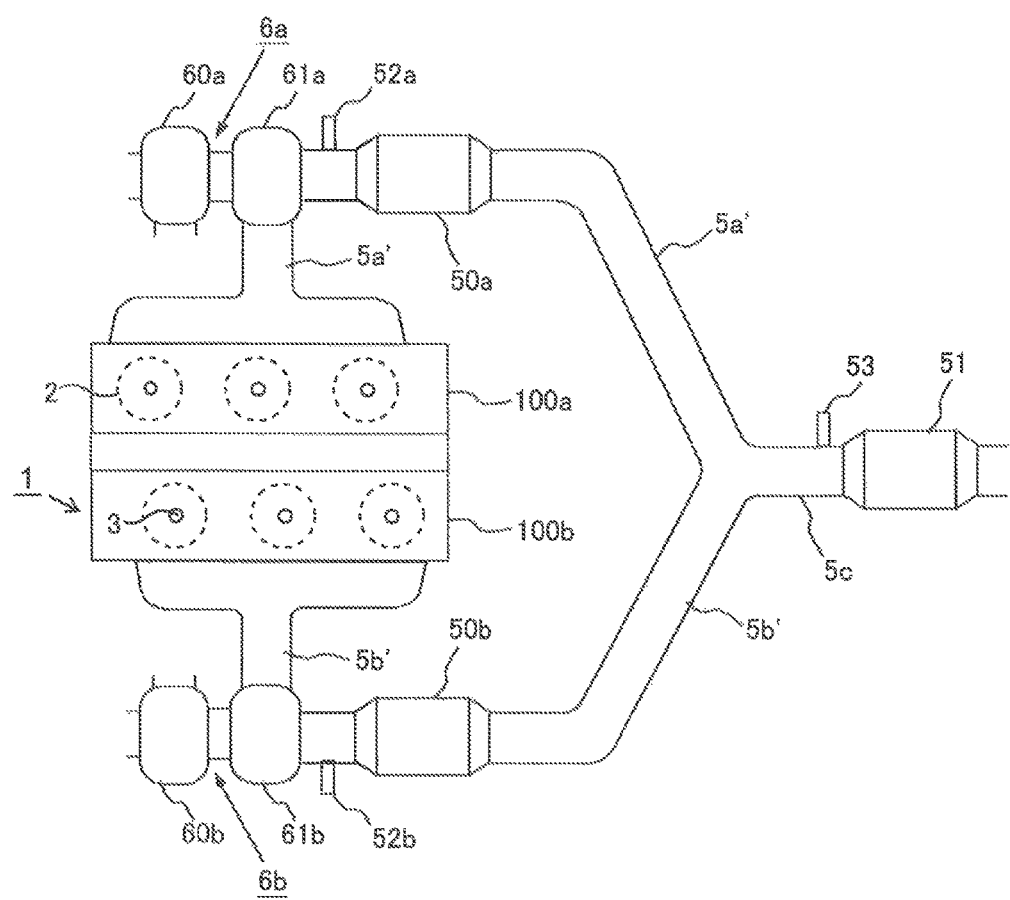
FIG. 9 illustrates a schematic configuration of an internal combustion engine and an exhaust system thereof in a modification of the second embodiment.

FIG. 9 illustrates a schematic configuration of an internal combustion engine and an exhaust system thereof in the present modification. In FIG. 9, component members similar to those in the second embodiment described before are designated by similar reference signs. The exhaust system of the internal combustion engine 1 illustrated in FIG. 9 includes a first exhaust passage 5a' connected to the first bank 100a, a second exhaust passage 5b' connected to the second bank 100b, and a third exhaust passage 5c formed by confluence of the first exhaust passage 5a' and the second exhaust passage 5b' (a position at which the first exhaust passage 5a' and the second exhaust passage 5b' converge with each other). In the course of the first exhaust passage 5a', a turbine 61a of a first turbocharger 6a, a first fuel addition valve 52a, and a first upstream casing 50a are disposed in order from the upstream side in the flow direction of exhaust gas. In the course of the second exhaust passage 5b', a turbine 61b of a second turbochargers 6b, a second fuel addition valve 52b, and a second upstream casing 50b are disposed in order from the upstream side in the flow direction of exhaust gas. In the course of the third exhaust passage 5c, a urea addition valve 53 and a downstream casing 51 are disposed in order from the upstream side in the flow direction of exhaust gas.

Figure 10:
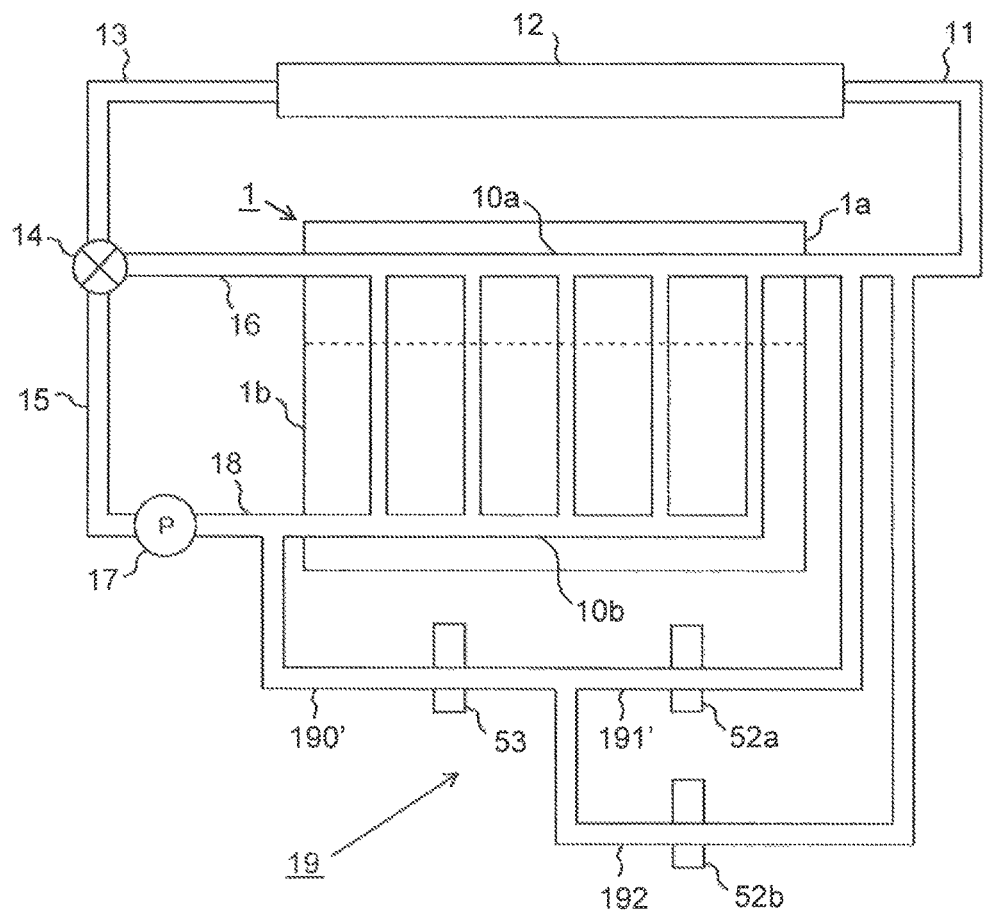
FIG. 10 illustrates the configuration of a cooling device in the modification of the second embodiment.

Next, FIG. 10 illustrates the configuration of a cooling device in the present modification. In FIG. 10, component members similar to those in the second embodiment described before are designated by similar reference signs. The valve cooling passage 19 in the present modification includes a first valve cooling passage 190', and two cooling passages 191', 192 branching from the first valve cooling passage 190'. The first valve cooling passage 190' is a channel branching from some midpoint of the fourth channel 18 and extending through the urea addition valve 53. One cooling passage 191' (which is referred to as "second valve cooling passage 191'" below) out of the two cooling passages 191', 192 is configured such that some of the cooling water that flowed through the urea addition valve 53 flows through the first fuel addition valve 52a and then converges with the cooling water of the first channel 11. The other cooling passage 192 (which is referred to as "third valve cooling passage 192" below) out of the two aforementioned cooling passages 191', 192 is configured such that a residue of the cooling water after flowing through the urea addition valve 53 flows through the second fuel addition valve 52b and then converges with the cooling water of the first channel 11.

Here, no cooling objects other than the urea addition valve 53 are disposed in the first valve cooling passage 190'. No cooling objects other than the first fuel addition valve 52a are disposed in the second valve cooling passage 191'. Similarly, no cooling objects other than the second fuel addition valve 52b are disposed in the third valve cooling passage 192.

According to the cooling device configured as described in the foregoing, some of the cooling water that cooled the urea addition valve 53 cools the first fuel addition valve 52a subsequent to the urea addition valve 53, Furthermore, some of the residue of the cooling water that cooled the urea addition valve 53 cools the second fuel addition valve 52b subsequent to the urea addition valve 53. Therefore, as in the first embodiment described before, it becomes possible to suppress overheating of the urea addition valve 53, while suppressing overheating of the fuel addition valves 52a, 52b.

In the second embodiment and the modification of the second embodiment described before, the V-type internal combustion engine is taken as an example. However, the configuration illustrated in FIG. 8 or 10 is applicable to, for example, an in-line multiple cylinder internal combustion engine including six or more cylinders disposed in series, in which part of the exhaust system is divided into two systems.

Now, a third embodiment of the present disclosure will be described with reference to FIG. 11. Here, configuration aspects different those described in the first embodiment will be described, while description of similar configuration aspects is omitted, In the aforementioned first embodiment, the valve cooling passage 19 is attached to the circuit through which the cooling water of the internal combustion engine 1 circulates. In the present embodiment, the valve cooling passage 19 is attached to a cooling circuit of an intercooler 43 in the case where the intercooler 43 is a water cooling-type heat exchanger.

Figure 11:
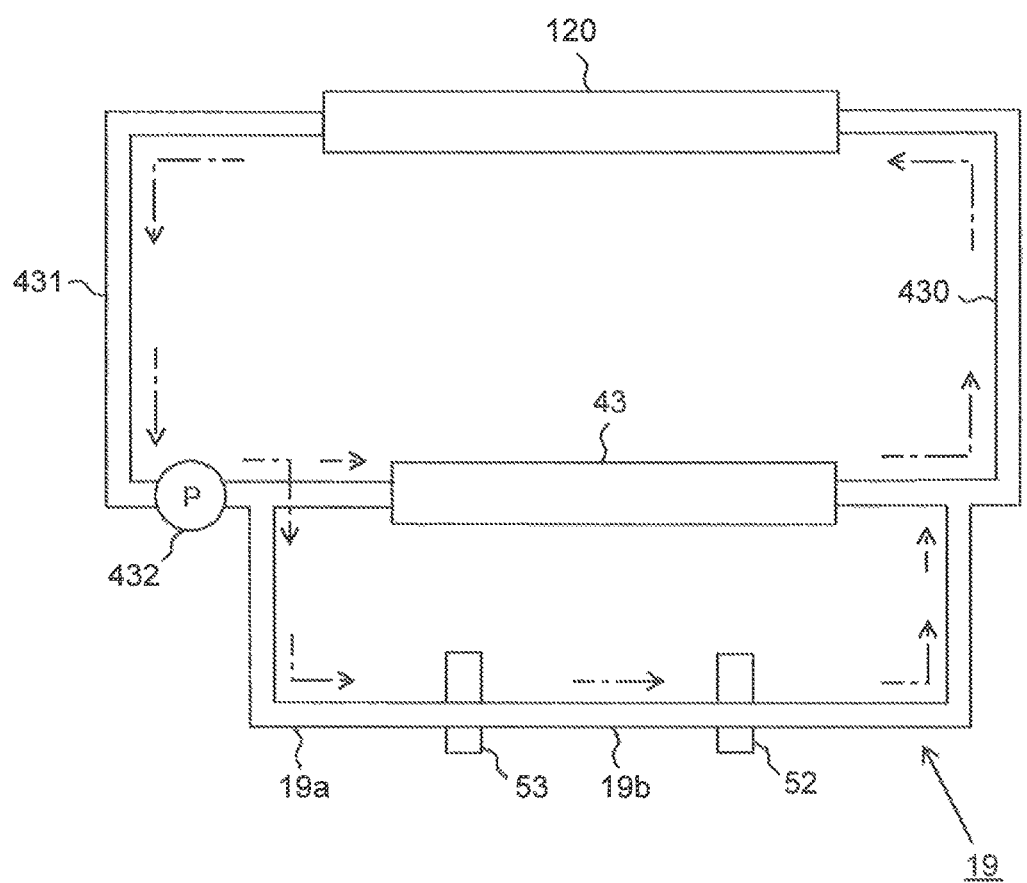
FIG. 11 illustrates the configuration of a cooling device in a third embodiment.

FIG. 11 illustrates the configuration of a cooling device of the present embodiment. The cooling device illustrated in FIG. 11 includes an outlet channel 430. The outlet channel 430 guides the cooling water flowing out of a cooling water outlet of the intercooler 43 to a cooling water inlet of a radiator 120. The radiator 120 is provided separately from the radiator 12 that radiates heat of the cooling water of the internal combustion engine 1. The cooling device also includes an inlet channel 431. The inlet channel 431 guides the cooling water flowing out of a cooling water outlet of the radiator 120 to a cooling water inlet of the intercooler 43. In some midpoint of the inlet channel 431, an electric water pump 432 is attached to pump out the cooling water in the inlet channel 431 from the cooling water outlet-side of the radiator 120 toward the cooling water inlet-side of the intercooler 43. A portion of the inlet channel 431 between the electric water pump 432 and the intercooler 43 is connected to an upstream end of the valve cooling passage 19. A downstream end of the valve cooling passage 19 is connected to some midpoint of the outlet channel 430. The valve cooling passage 19 is configured such that cooling water cools the urea addition valve 53 first, and then cools the fuel addition valve 52 subsequent to the urea addition valve 53 as in the first embodiment described before.

According to the cooling device configured as described in the foregoing, the urea addition valve 53 is cooled with low-temperature cooling water after radiating heat in the radiator 12.0 and before flowing into the intercooler 43. Accordingly, it becomes possible to prevent the urea addition valve 53 from being overheated to the temperature that causes deterioration of the urea aqueous solution. In the portion of the valve cooling passage 19 between the urea addition valve 53 and the fuel addition valve 52, no cooling objects other than these urea addition valve 53 and fuel addition valve 52 are disposed. Consequently, the temperature of the cooling water flowing through the fuel addition valve 52 can be suppressed as low as possible. As a result, it also becomes possible to prevent the fuel addition valve 52 from being overheated to the temperature that causes deterioration of the fuel. Furthermore, since the valve cooling passage 19 in the present embodiment is disposed in parallel with the channel that carries the cooling water flowing through the intercooler 43, it becomes possible to cool the urea addition valve 53 and the fuel addition valve 52, without degrading the cooling efficiency of the intercooler 43.

What is claimed is:

1. An exhaust gas control system comprising:
   a first upstream purification device disposed in a first exhaust passage of an internal combustion engine, that is a compression ignition engine, the internal combustion engine configured to be operated to perform lean combustion, the first upstream purification device including an oxidation catalyst;
a first downstream purification device disposed in a portion of the first exhaust passage downstream from the first upstream purification device, the first downstream purification device including a selective catalytic reduction catalyst;
a first fuel addition valve disposed in a portion of the first exhaust passage upstream from the first upstream purification device, the first fuel addition valve configured to add fuel into exhaust gas;
a first urea addition valve disposed in a portion of the first exhaust passage between the first upstream purification device and the first downstream purification device, the first urea addition valve configured to add urea aqueous solution into the exhaust gas; and
a first valve cooling passage configured such that
i) refrigerant passes the first urea addition valve and the first fuel addition valve in order, and
ii) the refrigerant cools the first fuel addition valve after the refrigerant cools the first urea addition valve.

2. The exhaust gas control system according to claim 1, wherein
the upstream purification device includes a particulate filter configured to collect particulate matter in the exhaust gas.

3. The exhaust gas control system according to claim 1, wherein
the internal combustion engine is configured to be cooled with the refrigerant, the internal combustion engine includes a radiator configured to radiate heat of the refrigerant that has passed the internal combustion engine, and
the first valve cooling passage is configured such that the refrigerant that has passed the first urea addition valve and the first fuel addition valve and the refrigerant that has passed the internal combustion engine and that has not passed the radiator converge with each other.

4. The exhaust gas control system according to claim 1, wherein
the internal combustion engine includes an exhaust gas turbine turbocharger configured to be cooled with the refrigerant, the exhaust gas turbine turbocharger is configured such that a centrifugal compressor is driven using exhaust gas energy of the internal combustion engine, and
the first valve cooling passage is disposed in parallel with a passage in which the refrigerant passes the exhaust gas turbine turbocharger.

5. The exhaust gas control system according to claim 1, further comprising:
a second upstream purification device disposed in a second exhaust passage of the internal combustion engine operated to perform lean combustion;
a second downstream purification device disposed in a portion of the second exhaust passage downstream from the second upstream purification device;
a second fuel addition valve disposed in a portion of the second exhaust passage upstream from the second upstream purification device;
a second urea addition valve disposed in a portion of the second exhaust passage between the second upstream purification device and the second downstream purification device; and
a second valve cooling passage configured such that the refrigerant cools the second fuel addition valve subsequent to the second urea addition valve.

6. The exhaust gas control system according to claim 5, wherein
the internal combustion engine is configured to be cooled with the refrigerant, the internal combustion engine includes a radiator configured to radiate heat of the refrigerant that has passed the internal combustion engine,
the first valve cooling passage is configured such that a part of the refrigerant that has passed the radiator and that has not passed the internal combustion engine passes the first urea addition valve and the first fuel addition valve in this order, and
the second valve cooling passage is configured such that a part of the refrigerant that has passed the radiator and that has not passed the internal combustion engine passes the second urea addition valve and the second fuel addition valve in this order.

7. The exhaust gas control system according to claim 5, wherein
the internal combustion engine is configured to be cooled with the refrigerant, the internal combustion engine includes a radiator configured to radiate heat of the refrigerant that has passed the internal combustion engine,
the first valve cooling passage is configured such that the refrigerant that has passed the first urea addition valve and the first fuel addition valve in this order and the refrigerant that has passed the internal combustion engine and that has not passed the radiator converge with each other, and
the second valve cooling passage is configured such that the refrigerant that has passed the second urea addition valve and the second fuel addition valve in this order and the refrigerant that has passed the internal combustion engine and that has not passed the radiator converge with each other.

8. The exhaust gas control system according to claim 7, wherein
the first valve cooling passage is configured such that the refrigerant that has passed the first urea addition valve and the first fuel addition valve in this order and the refrigerant that has passed the internal combustion engine and that has not passed the radiator converge with each other, and
the second valve cooling passage is configured such that the refrigerant that has passed the second urea addition valve and the second fuel addition valve in this order and the refrigerant that has passed the internal combustion engine and that has not passed the radiator converge with each other.

9. The exhaust gas control system according to claim 5, wherein
the internal combustion engine includes an exhaust gas turbine turbocharger configured to be cooled with the refrigerant, the exhaust gas turbine turbocharger is configured such that a centrifugal compressor is driven using exhaust gas energy of the internal combustion engine, and
the first valve cooling passage and the second valve cooling passage are disposed in parallel with a passage in which the refrigerant passes the exhaust gas turbine turbocharger.

10. An exhaust gas control system, comprising:
a first exhaust passage;
a second exhaust passage;
a third exhaust passage connecting to a confluence of the first exhaust passage and the second exhaust passage;

a first upstream purification device disposed in the first exhaust passage of an internal combustion engine that is a compression ignition engine, the internal combustion engine configured to be operated to perform lean combustion;

a second upstream purification device disposed in the second exhaust passage of the internal combustion engine:

a first downstream purification device disposed in the third exhaust passage;

a first fuel addition valve disposed in a portion of the first exhaust passage upstream from the first upstream purification device;

a second fuel addition valve disposed in a portion of the second exhaust passage upstream from the second upstream purification device;

a first urea addition valve disposed in the third exhaust passage upstream from the first downstream purification device;

a first valve cooling passage configured such that refrigerant passes the first urea addition valve;

a second valve cooling passage configured such that a part of the refrigerant that has passed the first urea addition valve passes the first fuel addition valve; and a third valve cooling passage configured such that the remaining part of the refrigerant that has passed the first urea addition valve passes the second fuel addition valve, and the first valve cooling passage, the second valve cooling passage and the third valve cooling passage being configured such that
i) the part of the refrigerant that has cooled the first urea addition valve cools the first fuel addition valve subsequent to the first urea addition valve, and
ii) the remaining part of the refrigerant cools the second fuel addition valve subsequent to the first urea addition valve.

11. The exhaust gas control system according to claim 10, wherein
the internal combustion engine is configured to be cooled with the refrigerant, the internal combustion engine includes a radiator configured to radiate heat of the refrigerant that has passed the internal combustion engine,
the first valve cooling passage and the third valve cooling passage are configured such that a part of the refrigerant that has passed the radiator and that has not passed the internal combustion engine passes the first urea addition valve and the first fuel addition valve in this order, and
the second valve cooling passage and the third valve cooling passage are configured such that the remaining part of the refrigerant that has passed the radiator and that has not passed the internal combustion engine passes the first urea addition valve and the second fuel addition valve in this order.

12. The exhaust gas control system according to claim 10, wherein
the internal combustion engine is configured to be cooled with the refrigerant, the internal combustion engine includes a radiator configured to radiate heat of the refrigerant that has passed the internal combustion engine,
the first valve cooling passage and the third valve cooling passage are configured such that the refrigerant that has passed the first urea addition valve and the first fuel addition valve in this order and the refrigerant that has passed the internal combustion engine and that has not passed the radiator converge with each other, and
the second valve cooling passage and the third valve cooling passage are configured such that the refrigerant that has passed the first urea addition valve and the second fuel addition valve in this order and the refrigerant that has passed the internal combustion engine and that has not passed the radiator converge with each other.

13. The exhaust gas control system according to claim 12, wherein
the first valve cooling passage and the third valve cooling passage are configured such that the refrigerant that has passed the first urea addition valve and the first fuel addition valve in this order and the refrigerant that has passed the internal combustion engine and that has not passed the radiator converge with each other, and
the second valve cooling passage and the third valve cooling passage are configured such that the refrigerant that has passed the first urea addition valve and the second fuel addition valve in this order and the refrigerant that has passed the internal combustion engine and that has not passed the radiator converge with each other.

14. The exhaust gas control system according to claim 10, wherein
the internal combustion engine includes an exhaust gas turbine turbocharger configured to be cooled with the refrigerant, the exhaust gas turbine turbocharger is configured such that a centrifugal compressor is driven using exhaust gas energy of the internal combustion engine, and
the first valve cooling passage, the second valve cooling passage, and the third valve cooling passage are disposed in parallel with a passage in which the refrigerant passes the exhaust gas turbine turbocharger.

* * * * *